United States Patent [19]
Kool

[11] Patent Number: 5,693,226
[45] Date of Patent: Dec. 2, 1997

[54] APPARATUS FOR DEMONSTRATING A RESIDENTIAL POINT OF USE WATER TREATMENT SYSTEM

[75] Inventor: Dennis J. Kool, Kentwood, Mich.

[73] Assignee: Amway Corporation, Ada, Mich.

[21] Appl. No.: 572,563

[22] Filed: Dec. 14, 1995

[51] Int. Cl.⁶ .................................................. B01D 35/00
[52] U.S. Cl. ........................ 210/541; 239/434; 137/888
[58] Field of Search ................... 261/DIG. 75, DIG. 54, 261/DIG. 12, DIG. 56, DIG. 39, 115, 118, DIG. 78, 78.2; 73/861.63, 861.64; 137/888; 210/206, 199, 220, 541; 239/434, 434.5

[56] References Cited

U.S. PATENT DOCUMENTS

| | | | |
|---|---|---|---|
| Re. 21,416 | 4/1940 | Sargent | 261/DIG. 75 |
| 2,447,123 | 8/1948 | Jones | 261/DIG. 75 |
| 2,863,318 | 12/1958 | Schroder | 73/861.63 |
| 2,872,810 | 2/1959 | Shaffer | 73/861.63 |
| 3,013,432 | 12/1961 | O'Keeffe | 73/861.63 |
| 3,018,799 | 1/1962 | Volkmann et al. | 73/861.63 |
| 3,112,988 | 12/1963 | Coldren et al. | 261/DIG. 78 |
| 3,273,390 | 9/1966 | Brown | 73/861.64 |
| 3,636,765 | 1/1972 | Brown | 73/861.64 |
| 3,686,946 | 8/1972 | Halmi | 73/861.64 |
| 3,733,902 | 5/1973 | Halmi | 73/861.64 |
| 3,733,903 | 5/1973 | Halmi | 73/861.64 |
| 3,736,797 | 6/1973 | Brown | 73/861.64 |
| 3,774,645 | 11/1973 | Pompa | 73/861.63 |
| 3,814,389 | 6/1974 | August | 261/DIG. 78 |
| 3,889,537 | 6/1975 | Khuzaie | 73/861.64 |
| 4,019,983 | 4/1977 | Mandt | 261/DIG. 75 |
| 4,041,981 | 8/1977 | Davis et al. | 261/DIG. 75 |
| 4,109,862 | 8/1978 | Hughes | 261/DIG. 78 |
| 4,174,734 | 11/1979 | Bradham, III | 73/861.63 |
| 4,210,534 | 7/1980 | Molvar | 210/220 |
| 4,224,158 | 9/1980 | Molvar | 210/220 |
| 4,308,138 | 12/1981 | Woltman | 261/DIG. 75 |
| 4,313,827 | 2/1982 | Ratigan et al. | 261/DIG. 75 |
| 4,333,833 | 6/1982 | Longley et al. | 261/DIG. 75 |
| 4,382,044 | 5/1983 | Baumgartner | 261/DIG. 75 |
| 4,420,846 | 12/1983 | Bonner | 261/DIG. 75 |
| 4,516,434 | 5/1985 | Halmi | 73/861.64 |
| 4,528,847 | 7/1985 | Halmi | 73/861.64 |
| 4,640,782 | 2/1987 | Burleson | 261/DIG. 75 |
| 4,644,974 | 2/1987 | Zingg | 138/44 |
| 4,662,401 | 5/1987 | Zingg et al. | 137/824 |
| 4,695,378 | 9/1987 | Ackman et al. | 261/DIG. 75 |
| 4,885,084 | 12/1989 | Doyle | 261/DIG. 75 |
| 5,045,245 | 9/1991 | Chawla | 261/DIG. 78 |

FOREIGN PATENT DOCUMENTS

| | | |
|---|---|---|
| 418349 | 9/1925 | Germany. |
| 454409 | 1/1928 | Germany. |
| 602545 | 8/1934 | Germany. |

OTHER PUBLICATIONS

Paper No. 61-WA-80, Lwslie J. Hooper, Design and Calibration of the Lo-Loss Tube, Jan. 10, 1962, pp. 1-2, ASME Headquarters.

Primary Examiner—Cynthia L. Nessler
Attorney, Agent, or Firm—Amway Corporation

[57] ABSTRACT

An apparatus for demonstrating a residential point of use water treatment system includes a nipple having a first end and an outlet end, and a tee having an inlet branch, a suction branch, and an outlet branch, where the outlet branch includes structure for receiving the first end of the nipple. A nozzle is arranged in fluid communication with the inlet branch, suction branch, and a first end of the nipple. The apparatus also includes an influent hose for transporting influent to the inlet branch of the tee, a suction hose for transporting contaminant to the suction branch of the tee, and an effluent hose for transporting effluent from the outlet end of the nipple to the water treatment system.

18 Claims, 5 Drawing Sheets

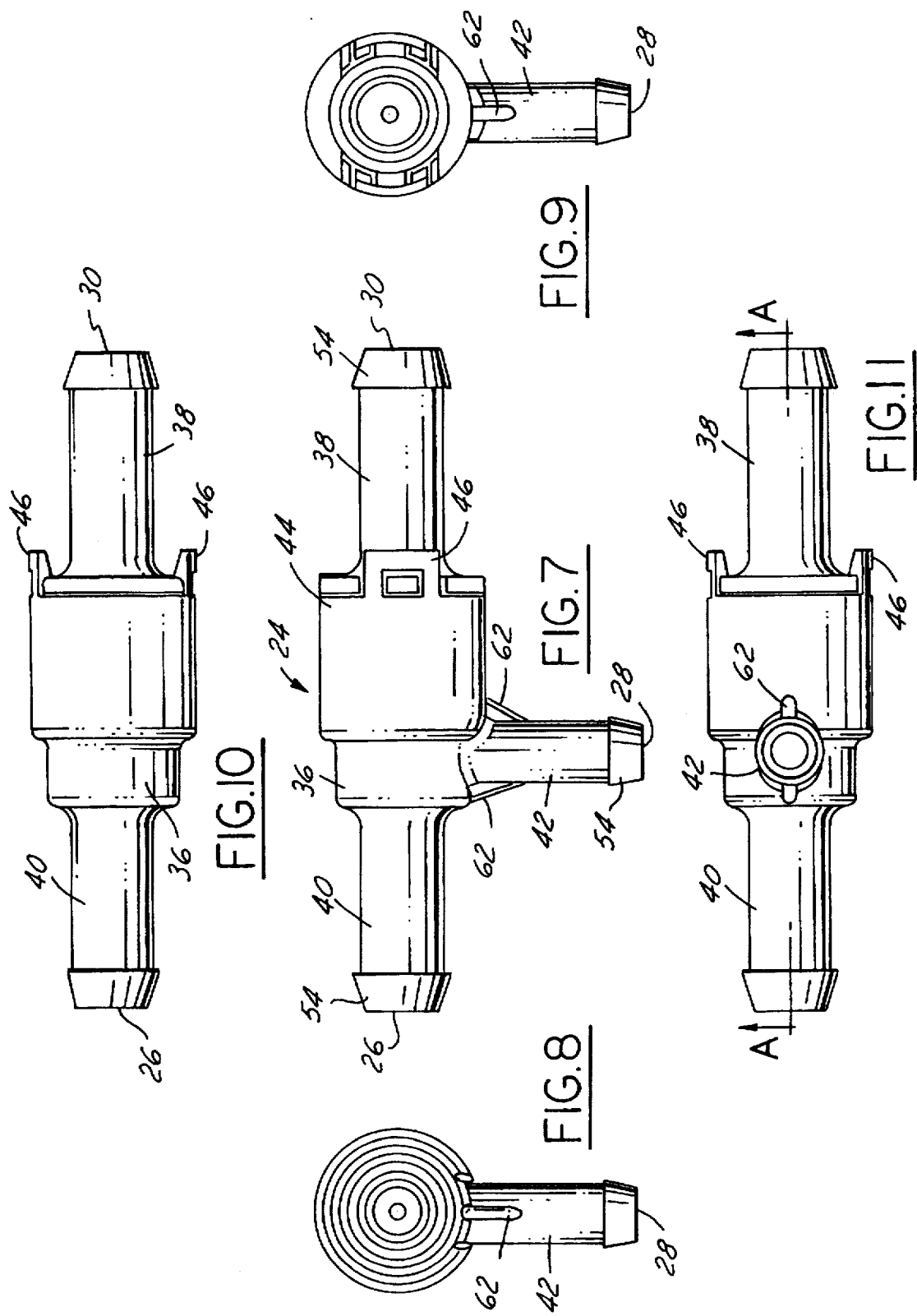

5,693,226

APPARATUS FOR DEMONSTRATING A RESIDENTIAL POINT OF USE WATER TREATMENT SYSTEM

BACKGROUND OF THE INVENTION

1. Field of the Invention

The present invention generally relates to liquid purification or separation using filters for drinking water and, more particularly, an apparatus for demonstrating a residential point of use water treatment system.

2. Description of Related Art

Direct selling techniques have been found to be particularly effective in the marketing of demonstrable home appliances such as residential point of use water treatment systems. During a typical in-home demonstration of such a water treatment system, the salesperson will mix tap water "influent" from the customer's faucet with a simulated "contaminant" material to form a visibly cloudy "effluent" stream for processing by a filter. Kaolinite powder is often used as the contaminant material because it quickly and easily forms a highly turbid and relatively stable suspension when mixed with water. Furthermore, an inexpensive and nontoxic source of kaolinite powder is readily available in the form of KAOPECTATE® brand intestinal medication. However, a variety of other fluid treatment systems and contaminants may also be used during a demonstration.

FIG. 1 illustrates a conventional apparatus for demonstrating a residential point of use water treatment system. The conventional apparatus 2 is connected to a customers faucet 4 by means of a diverter valve 6. One suitable diverter valve is disclosed in U.S. Pat. No. 5,279,329 to Pipple which is incorporated herein by reference. However, a variety of other conventional diverter valves may also be used.

In FIG. 1, diverter valve 6 routes some or all of the tap water influent from the faucet 4 through the influent hose 8 and into a closed contaminant vessel 10 where it mixes with a contaminant material previously loaded into the contaminant vessel 10. The water and contaminant effluent mixture contained in the contaminant vessel 10 then flows through the effluent hose 12 into the filter 14. Treated effluent flows out of the filter 14 and through the filter outlet hose 16 before leaving the apparatus through the diverter valve 6. The influent hose 8, closed contaminant vessel 10, effluent hose 12, and filter outlet hose 16 are typically formed from a transparent ¼ inch flexible tubing material in order to allow the customer to view the dramatic contrast between the influent, effluent, and treated water streams in each of the hoses. One product that is particularly well suited for this type of demonstration is the Amway Water Treatment System available from Amway Corporation in Ada, Mich.

The conventional apparatus 2 illustrated in FIG. 1 has been found to have a variety of limitations. For example, the closed contaminant vessel 10 must be large enough to allow adequate residence time for complete mixing of the water and contaminant. The large size of the closed contaminant vessel 10 makes the conventional apparatus 2 cumbersome to carry and set up in a customer's home. In addition, since contaminant is not continuously fed into the system, it can be difficult to adequately control the concentration or dilution of contaminant in the effluent stream going into the filter 14.

Contaminant concentration can be described in terms of a volumetric "dilution ratio." The dilution ratio of an effluent stream can be calculated by dividing the volume of influent in an effluent fluid sample by the volume of contaminant in that same fluid sample. Alternatively, for fluid influent and contaminant streams that are flowing together at constant rates, the dilution ratio may be calculated by dividing the influent flow rate by the contaminant flow rate.

With the conventional fluid treatment system demonstration apparatus 2, each demonstration initially begins with a highly concentrated effluent stream (having a low dilution ratio) flowing into filter 14. However, the dilution ratio quickly increases as additional tap water influent from influent hose 8 enters the closed contaminant vessel 10 and mixes with the remaining contaminant material. This initially high concentration of contaminant in the effluent stream can quickly plug or otherwise reduce the effectiveness of the filter 14 for the remainder of the demonstration. Furthermore, as the demonstration progresses and the effluent stream becomes more dilute, it becomes increasingly difficult to contrast the effluent stream in the effluent hose 12 with the treated water in the outlet hose 16. Moreover, once a demonstration has been completed, the salesperson must carefully disconnect and drain the hoses 8, 12, and 16 so as not to spill the remaining influent, effluent, and treated liquid in a customer's home.

SUMMARY OF THE INVENTION

These and other limitations in the prior art are overcome by providing an apparatus for demonstrating a point of use water treatment system including a venturi. The venturi may be formed from two injection molded ABS plastic components: (1) a tee having an inlet branch, a suction branch, and an outlet branch; and (2) a nipple. The inlet end of the nipple is arranged in the outlet branch of the tee so that the other outlet end of the nipple extends away from the tee. A lug on the outlet branch of the tee may be formed to mate with an ear on the nipple in order to firmly secure the nipple to the tee. The nipple may include one or more glands arranged on the first end of the nipple for supporting seals, such as O-ring seals, against the inside wall of the outlet branch of the tee. The nipple may also include a diverging duct extending from the first end of the nipple toward the outlet end.

A nozzle, preferably having a rho value of approximately 0.750 and a throat diameter of approximately 0.050 inches, may be arranged in fluid communication with the inlet branch, suction branch, and outlet branch of the tee. A suction chamber may be formed inside the tee substantially concentric with the nozzle and in fluid communication with the suction branch of the tee. A shoulder may be formed on the nipple for aligning the nozzle with the diverging duct inside the nipple. Hose barbs, or other hose connection features, may also be included on each of the inlet branch, suction branch, and outlet end of the nipple.

Influent from a faucet, or other source, is transported by the influent hose to the inlet pond of the tee where it flows through the inlet branch duct into the nozzle. Contaminant from a contaminant vessel, or other source, is transported by the suction hose to the suction pond of the tee where it flows through the suction branch duct into the suction chamber and mixes with influent from the nozzle. Effluent from the suction chamber flows into the inlet end of the nozzle and through the diverging nipple duct to the outlet end of the nipple where it is received by the effluent hose for transpond to the filter.

BRIEF DESCRIPTION OF THE DRAWINGS

The preferred embodiments of the invention will now be described with reference to the following drawings in which like features are identified by the same numeral in each of the various figures

FIG. 7 is a front elevational view of the venturi illustrated in FIG. 5;

FIG. 8 is a left side elevational view of the venturi illustrated in FIG. 5;

FIG. 9 is a right side elevational view of the venturi illustrated in FIG. 5;

FIG. 10 is a top side plan view of the venturi illustrated in FIG. 5;

FIG. 11 is a bottom side plan view of the venturi illustrated in FIG. 5;

FIG. 12b illustrates typical dimensions for the cross-section shown in FIG. 12a;

DESCRIPTION OF THE PREFERRED EMBODIMENTS

Figure 2:
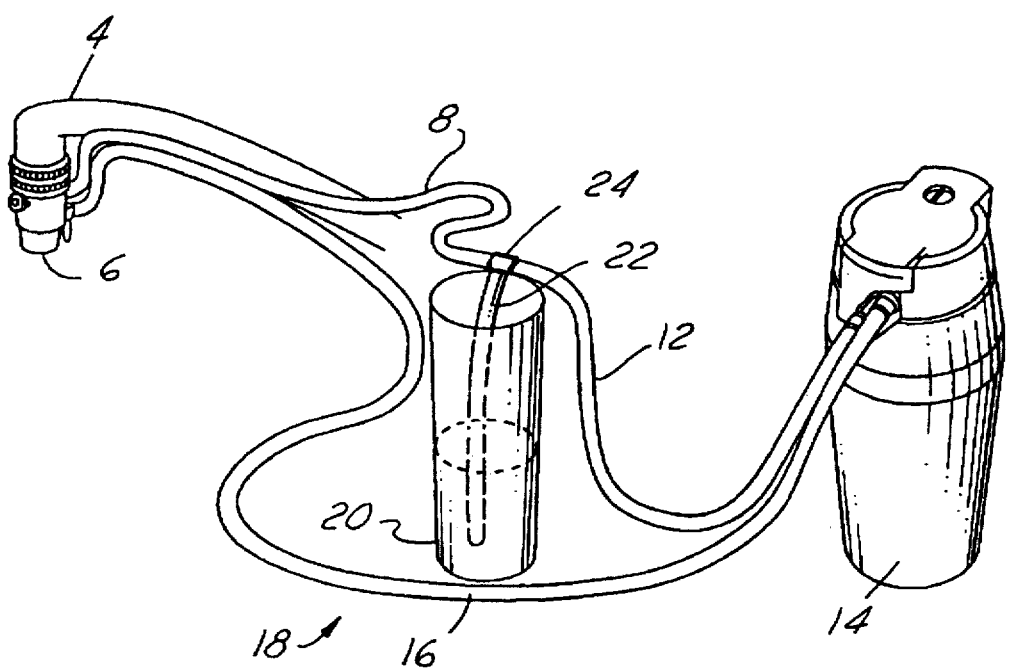
FIG. 2 is a schematic illustration of one embodiment of an improved fluid treatment demonstration apparatus.

FIG. 2 illustrates one embodiment of an improved fluid treatment demonstration apparatus 18. In FIG. 2, water from the faucet 4 flows through the diverter valve 6 and into the influent hose 8. A contaminant material, such as KAOPEC-TATE® intestinal medication mixed with water contained in the open contaminant vessel 20, is drawn up the suction hose 22 by the action of a venturi 24 which is described in more detail below. Influent tap water is mixed with contaminant inside the venturi 24 to form an effluent stream that flows out of the venturi 24 through the effluent hose 12 and into the filter 14. The flow rate of contaminant in the suction hose 22 to the venturi 24 is sometimes referred to as the "uptake flow rate."

Figure 1:
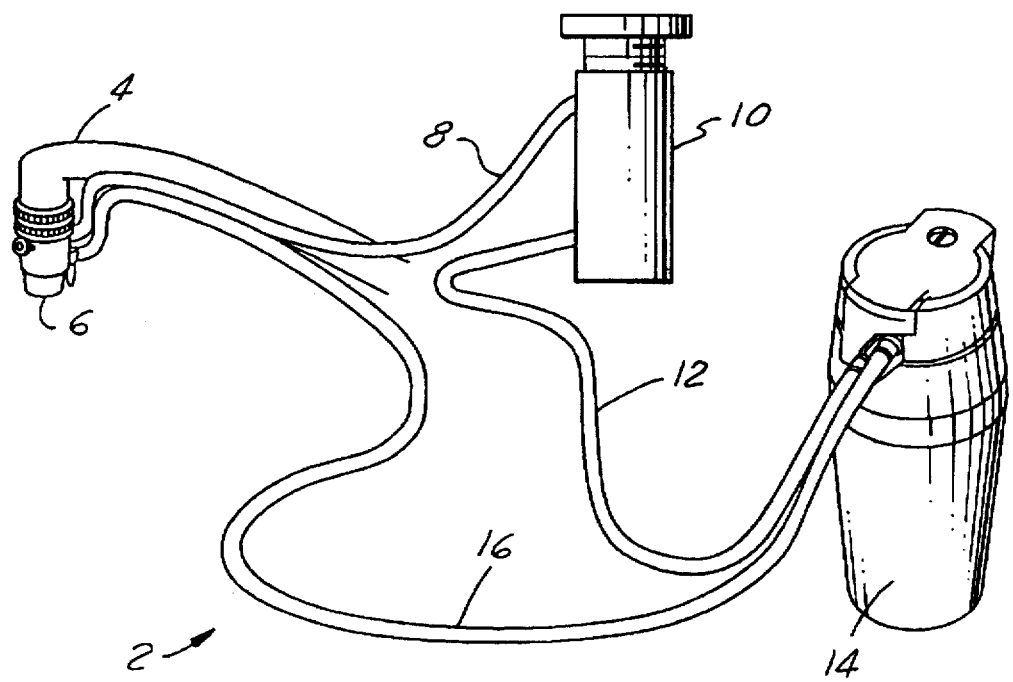
FIG. 1 is a schematic illustration of a conventional fluid treatment demonstration apparatus.

As shown in FIG. 2, the open contaminant vessel 20 may be a typical drinking glass from a customer's kitchen. Consequently, unlike with the conventional apparatus 2 illustrated in FIG. 1, a salesperson does not have to carry a large and cumbersome contaminant vessel into a customer's home when using the improved fluid treatment apparatus 18. Furthermore, the improved apparatus 18 is easier to disassemble without spilling contaminant, effluent, or treated liquid in the customer's home.

During any particular demonstration using the apparatus 18, the water pressure and flow from the faucet 4 and the back pressure against the venturi 24 due to the filter 14 will remain essentially constant so that the venturi 24 receives influent from the faucet 4 and contaminant from the open contaminant vessel 20 at a roughly constant dilution ratio. Consequently, the dilution ratio of the effluent stream in the effluent hose 12 remains consistently and noticeably different from the treated fluid in the filter outlet hose 16 during the entire demonstration so as to create a longer, more dramatic presentation.

According to the present invention, certain limitations associated with prior art venturies were addressed when prior art venturies were tested in a water treatment system demonstration system. For example, the influent source pressure at the faucet 4 can vary considerably from home to home in any one community and between communities in different areas. Consequently, during any particular demonstration, the concentration of contaminant in the effluent stream, and hence the impact of the demonstration on a customer, can vary depending upon the water pressure available at the customer's faucet. Furthermore, conventional venturies have been made from brass and are expensive to manufacture. These and other problems are solved, according to the present invention, by the provision of a less expensive polymer venturi which minimizes the effects of source pressure on the uptake flow rate of contaminant from open contaminant vessel 20.

Figure 3:
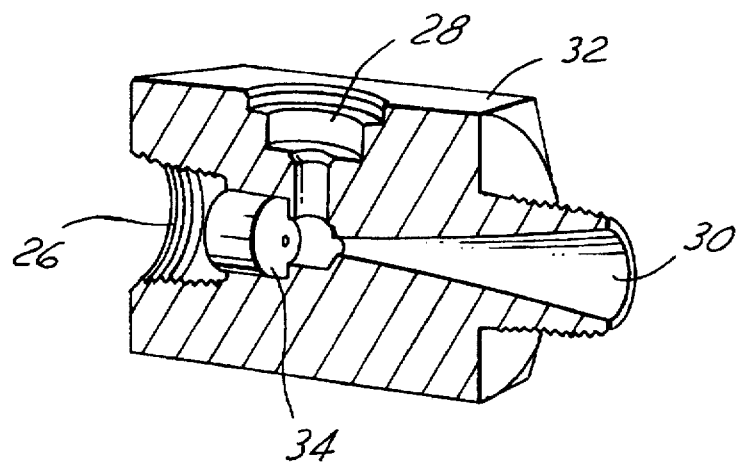
FIG. 3 is a cross-sectional view of a conventional venturi for use with the fluid treatment apparatus of FIG. 2.

In attempting to adapt a conventional venturi design to the improved fluid treatment apparatus 18, the inventor contacted several well-known suppliers of venturi flow devices in the United States. Dema Manufacturing Company of St. Louis, Mo. was the only supplier which claimed to be able to supply a venturi that satisfied the needs discussed above. In particular, Dema provided six roughly identical test samples of venturi "Model No. 201 C" which is illustrated, in cross-section, in FIG. 3. Each of the Dema venturies included a rectangular, machined solid brass housing 32 with a removable brass nozzle 34 arranged in the fluid flow path between the inlet port 26 and the outlet port 30.

Venturies are generally described by those of ordinary skill in the art using the terms "throat diameter" and "rho value" to describe the nozzle. The throat diameter of a nozzle is the smallest diameter of the fluid flow path through the nozzle. The rho value, or beta value, of a nozzle is the ratio of the major to minor axis of the elliptical cross section of the edge of the fluid flow path through the nozzle. In general, the flow path of a nozzle having a larger rho value makes a more abrupt transition from the larger inlet diameter to the smaller outlet, or throat diameter, of the nozzle.

The throat diameter of the nozzle in each of the Dema samples was approximately 0.060 inches. After considerable testing, the Dema venturi design proved to have several limitations. The solid brass housing 32 was bulky, heavy, and expensive to manufacture. In addition, each of the Dema prototypes which was tested proved to have insufficient uptake flow rates at the low faucet pressures expected during many demonstrations. As illustrated by the several flow curves labeled "A" in the lower portion of FIG. 4, each of the Dema sample venturies had an uptake flow rate of less than 50 ml/min. at a faucet pressure of 20 psig. The present inventor therefore turned his attention toward developing a new venturi with improved flow characteristics which could be manufactured from a less expensive and lighter-weight plastic material. Using nylon prototypes formed by stereo laser centering, the inventor experimented with Herschel-style venturies without nozzles, nozzle-style venturies without diverging exit ducts, and nozzle-style venturies with diverging exit ducts.

Figure 5:
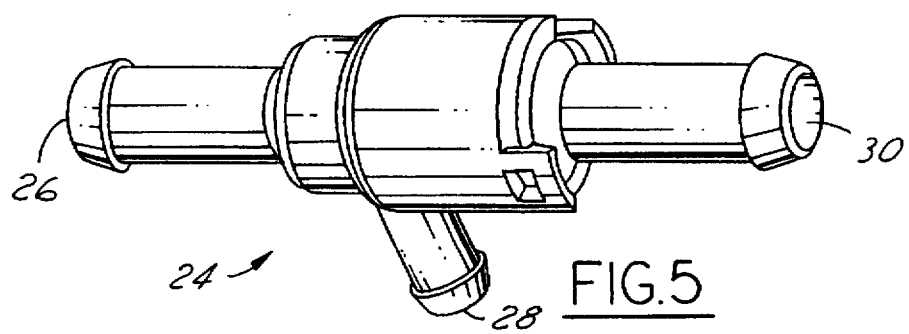
FIG. 5 is an isometric view of an improved venturi for use with the fluid treatment apparatus of FIG. 2.
Figure 6:
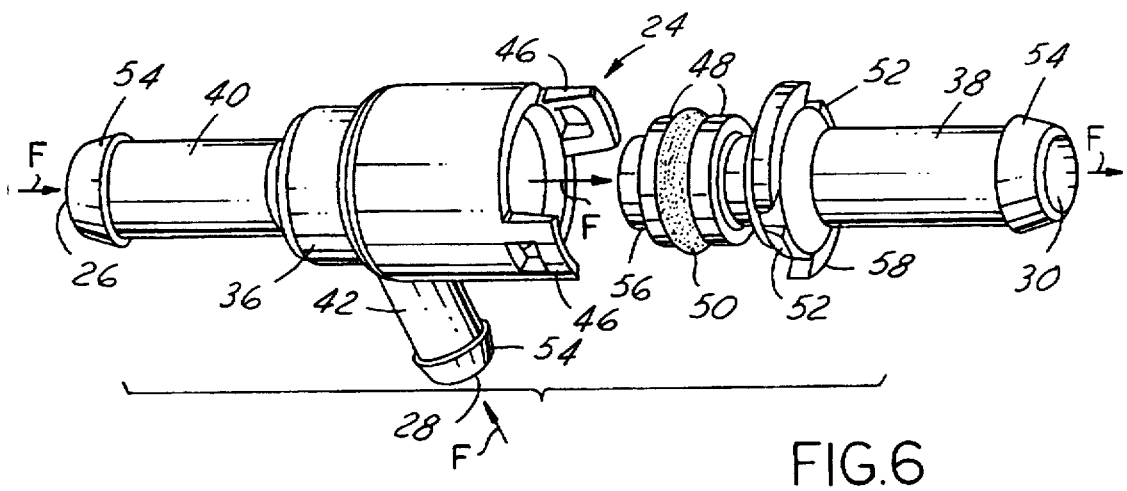
FIG. 6 is an exploded isometric view of the venturi illustrated in FIG. 5.

FIG. 5 illustrates a nozzle-style venturi with a diverging exit duct for use with the improved demonstration apparatus 18. FIG. 6 illustrates an exploded isometric view of the venturi in FIG. 5. In FIG. 6, the venturi 24 includes a tee portion 36 which mates with a nipple portion 38. The tee portion 36 includes an inlet branch 40, a suction branch 42, and an outlet branch 44. The inlet port 26 is arranged on the end of the inlet branch 40. The suction pod 28 is arranged on the end of the suction branch 42. The outlet pod 30 is arranged on the outlet end of the nipple 38. Lugs 46 are arranged at the opening of the outlet branch 44. The direction of flow through various parts of the venturi 24 is shown by arrows F.

The first (upstream or inlet) end of the nipple 38 may include one or more glands 48 for supporting an O-ring 50, or other type seal, against the inside of the outlet branch 44. Ears 52 may be snugly secured to the lugs 46 so as to create a liquid tight seal between the inside wall of the outlet branch 44. The inlet branch 40, suction branch 42, and outlet branch 44, may also include hose barbs 54 or other means for securing the venturi 24 to the influent hose 8, suction hose 22, and effluent hose 12, respectively.

Figure 12A:
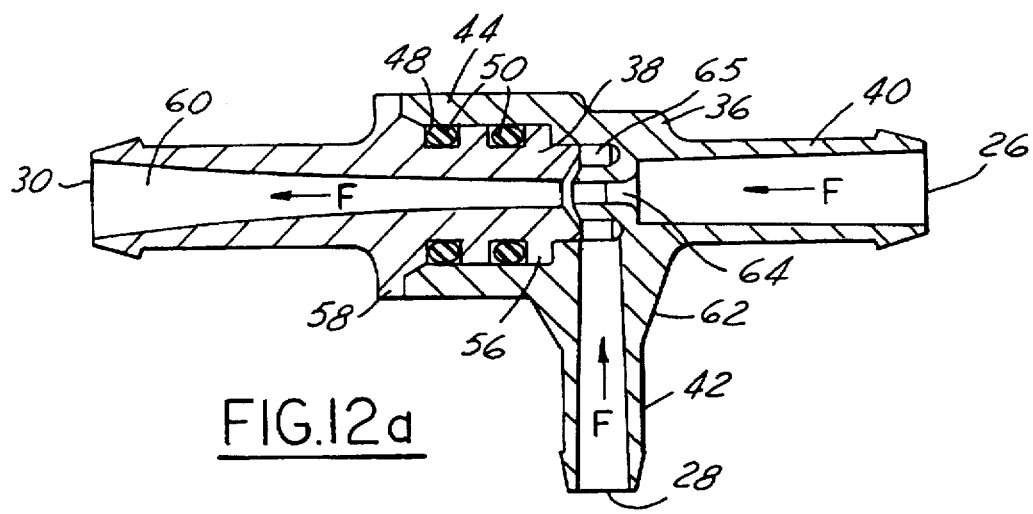
FIG. 12a is a cross-section taken along line A—A in FIG. 11.
Figure 12B:
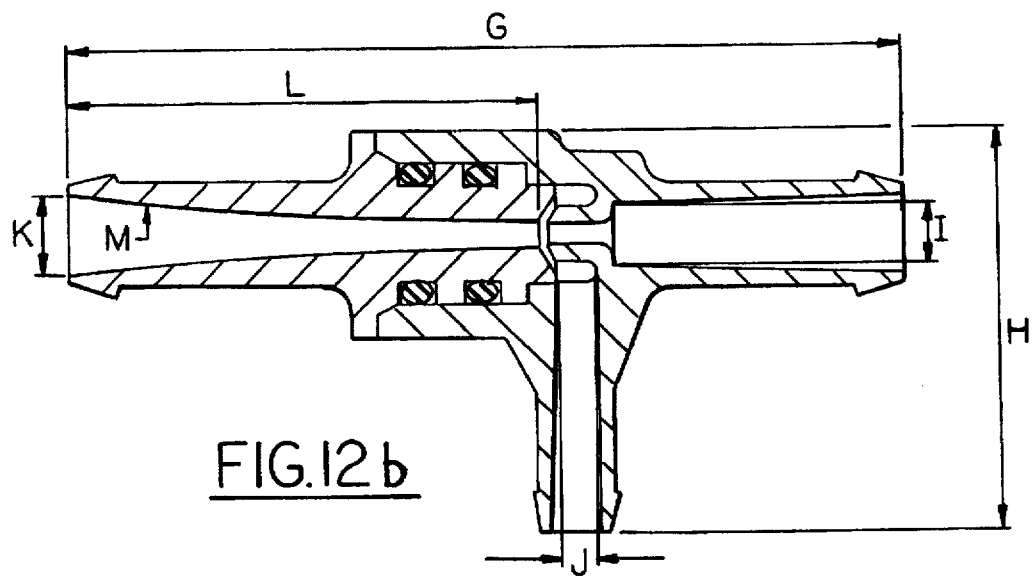

FIGS. 7 through 11 illustrate plan and elevational views of venturi 24 with the tee portion 36 secured to the nipple portion 38 and with like components being given the same numeral designations. FIG. 12a shows a cross-section of the venturi 24 taken across section line A—A in FIG. 11. FIG. 12b illustrates typical approximate dimensions for the cross-section illustrated in FIG. 12a where G=2.016 inches, H=0.975 inches, I=0.160 inches, J=0.100 inches, K=0.200 inches, L=1.140 inches, and M=0.414 rho.

FIG. 12a illustrates a shoulder 56 and a flange 58 on the nipple 38 for aligning the inlet end of the nipple 38 inside the outlet branch 44 of the tee 36. A nipple duct 60 diverges in the direction of flow F through the nipple 38. Ribs 62 provide additional support for the suction branch 42. In FIG. 12a, water or other influent flows into the inlet port 26 through the nozzle 64 and draws contaminant up through the suction port 28 and into the suction chamber 66. The contaminant and water effluent mixture flows from the suction chamber 66 into the nipple duct 60 and out of the outlet port 30. The nipple duct 60 preferably diverges in the direction of the flow in order to minimize pressure drop and allow for turbulent mixing of the contaminant material and the influent.

Figure 14:
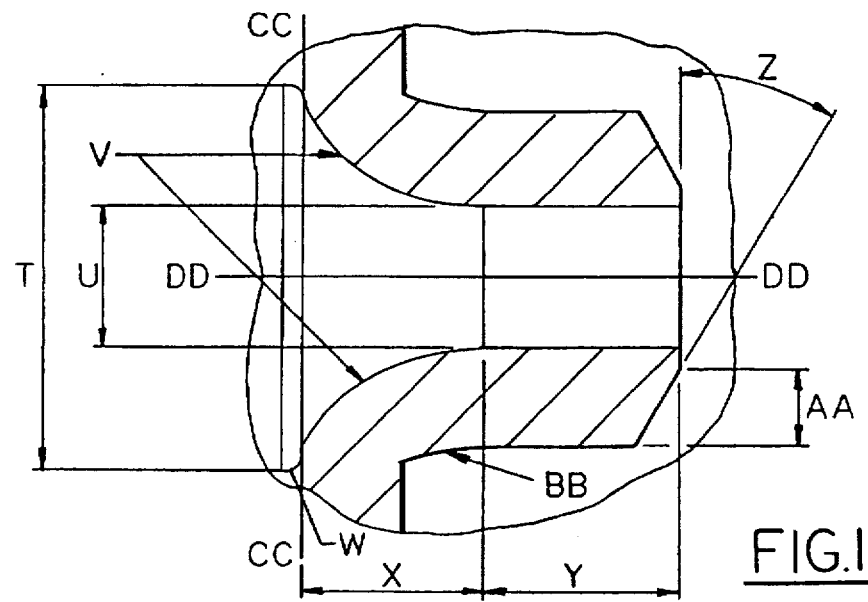
FIG. 14 shows typical dimensions for a nozzle according to the present invention.
Figure 13:
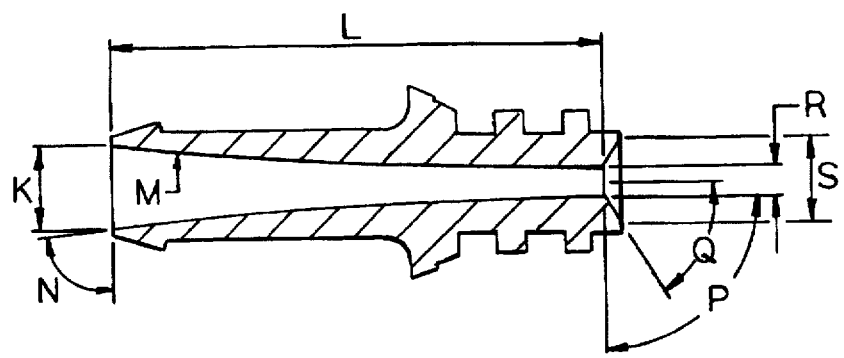
FIG. 13 shows typical dimensions for a nipple portion illustrated in FIGS. 12a and 12b.

FIG. 13 illustrates typical approximate dimensions for the nipple 38 shown in FIG. 12a where N=82 degrees, P=90 degrees, Q=60 degrees, R=0.070 inches, and S=0.200 inches. FIG. 14 illustrates typical dimensions for the nozzle 64 in FIG. 12a where, in one embodiment, T=0.160 inches, "throat diameter" U=0.060 inches, "rho value" V=0.414 rho, W=0.010 inches, X=0.075 inches, Y=0.080 inches, Z=30 degrees, AA=0.030 inches, and BB=0.414 rho based upon vertical and horizontal datum planes CC—CC and DD—DD.

According to the present invention, an experiment was conducted wherein a prototype venturi was machined from ABS plastic as shown in FIGS. 5 through 14. The nozzle 64 of the prototype venturi 24 was machined with a rho value of 0.414 and throat diameter of 0.060 inches. The machined prototype exhibited the following flow characteristics when used with tap water influent and KAOPECTATE® contaminant material:

| Flow Characteristics for Machined Prototype (0.060 inch throat diameter, 0.414 rho) | | | |
|---|---|---|---|
| Faucet Pressure | Influent Flow Rate | Uptake Flow Rate | Dilution Ratio |
| 20 psig | 0.33 gpm | 96 ml/min. | 13 |
| 40 | 0.52 | 268 | 7.3 |

-continued

| Flow Characteristics for Machined Prototype (0.060 inch throat diameter, 0.414 rho) | | | |
|---|---|---|---|
| Faucet Pressure | Influent Flow Rate | Uptake Flow Rate | Dilution Ratio |
| 60 | 0.63 | 347 | 6.9 |
| 80 | 0.69 | 361 | 7.2 |
| 100 | 0.75 | 382 | 7.4 |

Figure 4:
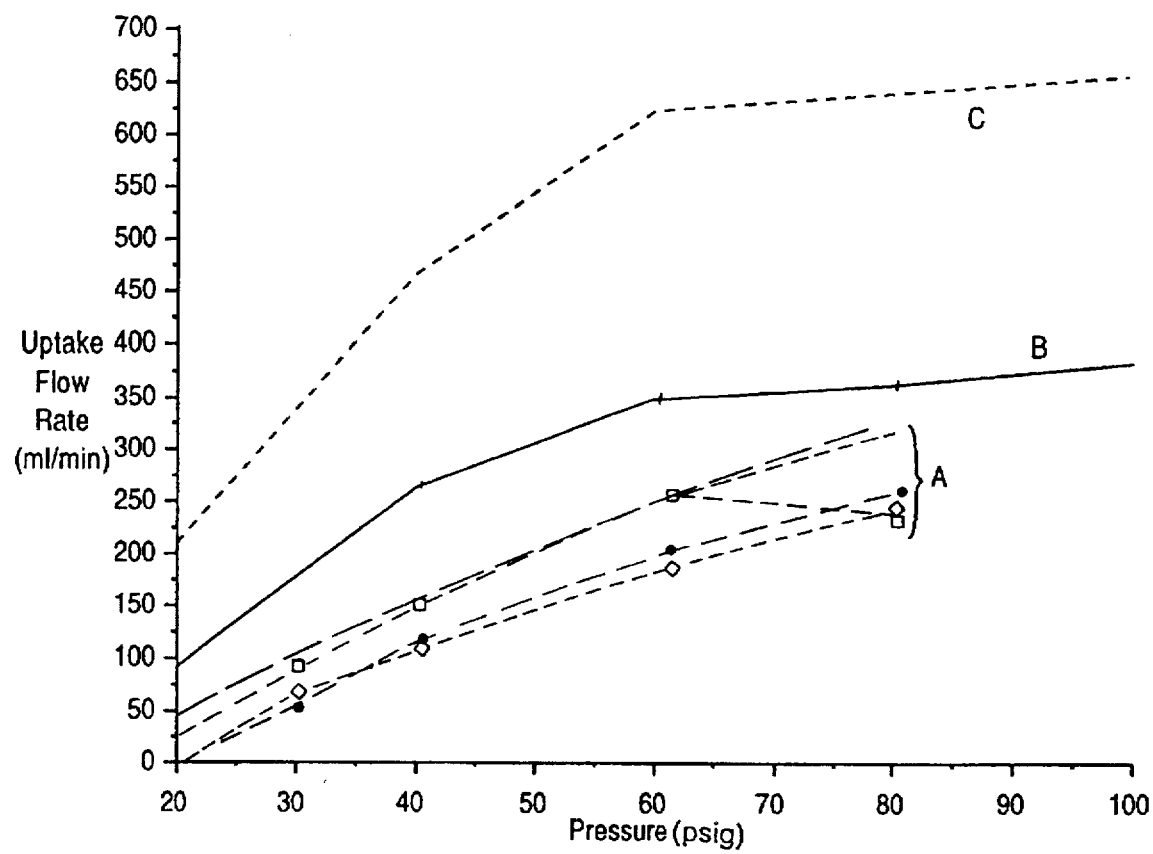
FIG. 4 is a graph of uptake flow rate verses influent pressure for various venturies.

A flow curve for this machined prototype is illustrated as the solid line "B" near the middle of FIG. 4. Although the machined prototype produced acceptable uptake flow rates at low pressures, it also exhibited increased dilution ratios at low pressures and was expensive to manufacture.

A venturi was then formed with the same 0.060 inch throat diameter and 0.414 rho value venturi design from a less expensive and easier to manufacture injection-molded ABS plastic material. The injection molded venturi was expected to perform substantially the same as the machined prototype venturi, but instead, surprisingly, the injection-molded venturi performed similar to the Dema 201C models. That is, a sample of three injection-molded prototype venturies exhibited insufficient uptake flow rates at low pressures as follows:

| Uptake Flow Rates for Injection-Molded Prototypes (0.060 throat diameter, 0.414 rho) | | | |
|---|---|---|---|
| Faucet Pressure | Prototype #1 | Prototype #2 | Prototype #3 |
| 20 psig | 22.93 ml/min. | 0.00 ml/min. | 0.00 ml/min. |
| 30 | 81.23 | 3.85 | 22.49 |
| 40 | 133.16 | 77.34 | 64.72 |
| 60 | 224.03 | 152.24 | 155.13 |
| 80 | 255.23 | 208.11 | 203.63 |
| 100 | 232.20 | 232.75 | 201.50 |

Conventional analysis indicated that the uptake flow rate of the injection-molded prototype would not be increased by decreasing the throat diameter of the nozzle 64. In fact, flow through the venturi 24 was analyzed using computational fluid dynamics software which predicted that a hypothetical venturi 24 having a 0.050 inch throat diameter and 0.414 rho value would cause influent to flow in the wrong direction out of the suction port 28.

However, according to the present invention, empirical testing surprisingly proved that a decrease of the throat diameter of the nozzle 64 (dimension U in FIG. 14) in the injection-molded venturi 24 from 0.060 inches to 0.050 inches did, in fact, increase the uptake flow rate as tabulated below and illustrated the by broken line "C" in FIG. 4.

| Flow Characteristics for Injection Molded Prototype (0.050 inch throat diameter, 0.750 rho value) | | | |
|---|---|---|---|
| Faucet Pressure | Influent Flow Rate | Uptake Flow Rate | Dilution Ratio |
| 20 psig | 0.36 gal./min. | 217.8 ml/min. | 6.3 |
| 30 | 0.47 | 349.4 | 5.1 |
| 40 | 0.60 | 466.0 | 4.9 |
| 50 | 0.66 | 553.5 | 4.5 |
| 60 | 0.72 | 620.6 | 4.4 |
| 80 | 0.83 | 644.3 | 4.9 |
| 100 | 0.91 | 651.8 | 5.3 |

In addition, it was discovered that increasing the "rho value" V in FIG. 14 from 0.414 to 0.750 reduced the pressure drop across the venturi without significantly affecting the uptake flow rate. Increasing the rho value V in FIG. 14 while maintaining dimension BB as 0.414 rho also allows for a more uniform nozzle wall thickness and allows the nozzle to be manufactured more easily using injection molding techniques. It is believed that these empirical results are inconsistent with those predicted by conventional analysis due to the small size of the nozzle.

It is within the scope of the invention to employ a range of valves for the throat diameter and rho valves. In particular, the rho valve may range from approximately 0.414 to 0.75 and the throat diameter may range from approximately 0.045 inches to 0.055 inches. Varying the throat diameter is believed to have a greater effect on performance than varying the rho valve. The various embodiments of the invention described above should be considered illustrative and exemplary, rather than definitive. Those of ordinary skill in the art will recognize various modifications which can be made to these embodiments without departing from the true scope and spirit of the invention which is defined by the following claims.

What is claimed is:

1. An apparatus for demonstrating a residential point of use water treatment system, comprising:

a venturi having an inlet port, an outlet port, and a suction port, said venturi further having a nozzle arranged in fluid communication with said inlet port, said suction port and said outlet port;

an influent hose for transporting liquid influent to the inlet port of said venturi;

a suction hose for transporting liquid contaminant to the suction port of said venturi; and a translucent effluent hose for transporting effluent from the outlet port of said venturi to the water treatment system whereby, the relative concentration of the liquid contaminant in the effluent in the effluent hose is visible;

wherein said nozzle is configured in fluid communication with said inlet port, said suction port, and said outlet port to produce a relatively constant effluent dilution ratio of liquid influent to liquid contaminant in response to liquid influent of varying pressure and liquid contaminant of relatively constant atmospheric pressure.

2. The apparatus as claimed in claim 1 wherein said venturi includes a suction chamber arranged substantially concentric with said nozzle and in fluid communication with said suction port.

3. The apparatus as claimed in claim 1, wherein said venturi includes a diverging duct arranged between said nozzle and said outlet port.

4. The apparatus as claimed in claim 1, where the effluent dilution ratio varies between 4.4 to 6.3 in response to influent pressure ranging between 20–100 psig.

5. The apparatus as claimed in claim 1, wherein the effluent hose is transparent.

6. The apparatus as claimed in claim 1, wherein a rho value of said nozzle is approximately 0.75.

7. The apparatus as claimed in claim 6, wherein a throat diameter of said nozzle is approximately 0.050 inches.

8. The apparatus as claimed in claim 1, wherein said venturi includes:

a nipple having a first end and an outlet end, said outlet port of the venturi means arranged on said outlet end of said nipple; and a tee having an inlet branch, a suction branch, and an outlet branch, said outlet branch including means for receiving the first end of said nipple.

9. The apparatus as claimed in claim 8, wherein said nipple includes a shoulder for aligning said nipple in the outlet branch of said tee.

10. The apparatus as claimed in claim 8, wherein said nipple includes at least one ear, and wherein said tee includes a lug for mating with each respective ear on said nipple and securing said nipple to said tee.

11. The apparatus as claimed in claim 10, wherein said nipple includes at least one gland arranged on the first end of said nipple for supporting a seal against the outlet branch of said tee.

12. An apparatus for demonstrating a point of use water treatment system, comprising:

a tee having an inlet branch, a suction branch, and an outlet branch, said outlet branch including a lug;

a nipple having a first end arranged in the outlet branch of said tee, an outlet end opposite the first end extending from the tee and an ear for mating with said lug and securing the nipple to the tee;

said nipple including at least one gland arranged on said first end for supporting an O-ring seal against the outlet branch of said tee and a diverging duct extending from the first end of the nipple to the outlet end of the nipple;

a nozzle arranged in fluid communication with the inlet branch, suction branch, and outlet branch of said tee, the nozzle configured to produce a relatively constant effluent dilution ratio of liquid influent to liquid contaminant in response to liquid influent of varying pressure and liquid contaminant of relatively constant atmospheric pressure;

said nozzle having a rho value of approximately 0.75 and a throat diameter of approximately 0.050 inches;

said nipple also having a shoulder for aligning the nozzle with said diverging duct in said nipple;

a suction chamber arranged in said tee substantially concentric with said nozzle and in fluid communication with the suction branch of the tee;

a hose barb, arranged on each of said inlet branch, suction branch, and outlet end of said nipple;

an influent hose, attached to the hose barb on said inlet branch, for transporting said liquid influent to the inlet branch of said tee;

a suction hose, attached to the hose barb on said suction branch, for transporting said liquid contaminant to the suction branch of said tee; and a translucent effluent hose, attached to the hose barb on said outlet end of the nipple, for transporting effluent from the outlet end of said nipple to the water treatment system.

13. An apparatus for demonstrating a residential point of use water treatment system, comprising:

a nipple having a first end and an outlet end;

a tee having an inlet branch, a suction branch, and an outlet branch, said outlet branch including means for receiving the first end of said nipple;

an influent hose for transporting liquid influent to the inlet branch of said tee; a suction hose for transporting liquid contaminant to the suction branch of said tee; and a transparent effluent hose for transporting effluent from the outlet end of said nipple to the water treatment system;

wherein said nozzle is configured in fluid communication with said inlet branch, said suction branch, and the first end of said nipple to produce a relatively constant effluent dilution ratio of liquid influent to liquid contaminant in response to liquid influent of varying pressure and liquid contaminant of relatively constant atmospheric pressure.

14. The apparatus as recited in claim 13, wherein a rho value of said nozzle is approximately 0.75.

15. The apparatus as claimed in claim 14, wherein a throat diameter of said nozzle is approximately 0.050 inches.

16. The apparatus as claimed in claim 15, wherein said tee includes a suction chamber arranged substantially concentric with said nozzle and in fluid communication with said suction branch.

17. The apparatus as claimed in claim 16, wherein said nipple includes a diverging duct.

18. The apparatus as claimed in claim 17, wherein the first end of said nipple includes a shoulder for aligning said diverging duct with said nozzle.

* * * * *